US011292088B2

(12) United States Patent
Bell

(10) Patent No.: US 11,292,088 B2
(45) Date of Patent: *Apr. 5, 2022

(54) WEAR RESISTANT COATING

(71) Applicant: Oerlikon Metco (US) Inc., Westbury, NY (US)

(72) Inventor: Andrew Bell, Forthampton (GB)

(73) Assignee: Oerlikon Metco (US) Inc., Westbury, NY (US)

( * ) Notice: Subject to any disclaimer, the term of this patent is extended or adjusted under 35 U.S.C. 154(b) by 608 days.

This patent is subject to a terminal disclaimer.

(21) Appl. No.: 16/167,322

(22) Filed: Oct. 22, 2018

(65) Prior Publication Data
US 2019/0054574 A1    Feb. 21, 2019

Related U.S. Application Data

(63) Continuation of application No. 14/504,199, filed on Oct. 1, 2014, now abandoned.
(Continued)

(51) Int. Cl.
*B23K 35/02* (2006.01)
*C22C 32/00* (2006.01)
(Continued)

(52) U.S. Cl.
CPC .......... *B23K 35/0227* (2013.01); *B22F 1/025* (2013.01); *B23K 1/0008* (2013.01); *B23K 3/063* (2013.01); *B23K 31/00* (2013.01); *B23K 35/0244* (2013.01); *B23K 35/0261* (2013.01); *B23K 35/24* (2013.01); *B23K 35/368* (2013.01); *B23K 35/40* (2013.01); *C22C 19/05* (2013.01);
(Continued)

(58) Field of Classification Search
None
See application file for complete search history.

(56) References Cited

U.S. PATENT DOCUMENTS 3,254,970 A * 6/1966 Dittrich .................... C23C 4/08
428/570
4,173,457 A    11/1979 Smith
(Continued)

FOREIGN PATENT DOCUMENTS

EP    0349172 A1    1/1990
GB    2408474 A    6/2005
(Continued)

OTHER PUBLICATIONS

European Patent Office Search Report, for Application No. 14186425. 6, 9 pages, dated Apr. 28, 2015.
(Continued)

*Primary Examiner* — Anthony M Liang
(74) *Attorney, Agent, or Firm* — Christensen, Fonder, Dardi & Herbert PLLC

(57) ABSTRACT

A composite material comprising a plurality of round particles bound together by a binding material. Each of the plurality of round particles includes a wear resistant element, an intermediate coating on the wear resistant element, and a round outer layer encapsulating the intermediate coating and the wear resistant element. The intermediate coating is metallurgically bonded to the wear resistant element, and is metallurgically bondable to the binding material.

20 Claims, 9 Drawing Sheets

Related U.S. Application Data

(60) Provisional application No. 61/885,704, filed on Oct. 2, 2013.

(51) Int. Cl.

| | | |
|---|---|---|
| *C22C 26/00* | (2006.01) | |
| *C22C 19/05* | (2006.01) | |
| *B23K 35/40* | (2006.01) | |
| *B23K 35/368* | (2006.01) | |
| *B23K 35/24* | (2006.01) | |
| *B22F 1/02* | (2006.01) | |
| *B23K 31/00* | (2006.01) | |
| *B23K 3/06* | (2006.01) | |
| *B23K 1/00* | (2006.01) | |
| *B23K 101/00* | (2006.01) | |
| *B23K 101/20* | (2006.01) | |

(52) U.S. Cl.
CPC .............. *C22C 26/00* (2013.01); *C22C 32/00* (2013.01); *B23K 2101/00* (2018.08); *B23K 2101/20* (2018.08)

(56) References Cited

U.S. PATENT DOCUMENTS

| | | |
|---|---|---|
| 4,739,146 A | 4/1988 | Lindland |
| 5,024,680 A | 6/1991 | Chen |
| 5,755,298 A | 5/1998 | Langford, Jr. et al. |
| 5,755,299 A | 5/1998 | Langford, Jr. et al. |
| 5,957,365 A | 9/1999 | Anthon |
| 6,641,918 B1 | 11/2003 | Sherman et al. |
| 8,079,428 B2 | 12/2011 | Lyons et al. |
| 2002/0069592 A1 | 6/2002 | Sherman |
| 2002/0095875 A1 | 7/2002 | D'Evelyn |
| 2005/0022457 A1* | 2/2005 | Chen ..................... B23D 61/18 51/307 |
| 2008/0029310 A1 | 2/2008 | Stevens et al. |
| 2008/0202821 A1 | 8/2008 | McClain |
| 2008/0282618 A1 | 11/2008 | Lockwood |
| 2010/0101866 A1 | 4/2010 | Bird |
| 2010/0122853 A1 | 5/2010 | Scott |
| 2010/0215849 A1 | 8/2010 | Fischer |
| 2010/0266851 A1 | 10/2010 | Aton, III et al. |
| 2012/0009345 A1 | 1/2012 | Gush |
| 2013/0043078 A1 | 2/2013 | Qian et al. |
| 2013/0196169 A1 | 8/2013 | Boddapati |

FOREIGN PATENT DOCUMENTS

| | | |
|---|---|---|
| WO | WO9706339 A1 | 2/1997 |
| WO | WO9936590 A1 | 7/1999 |

OTHER PUBLICATIONS

File History, for U.S. Appl. No. 14/504,212, Oct. 1, 2014 to Sep. 25, 2018 (223 pages).

File History, for U.S. Appl. No. 15/464,027, Mar. 20, 2017 to Sep. 25, 2018 (139 pages).

* cited by examiner

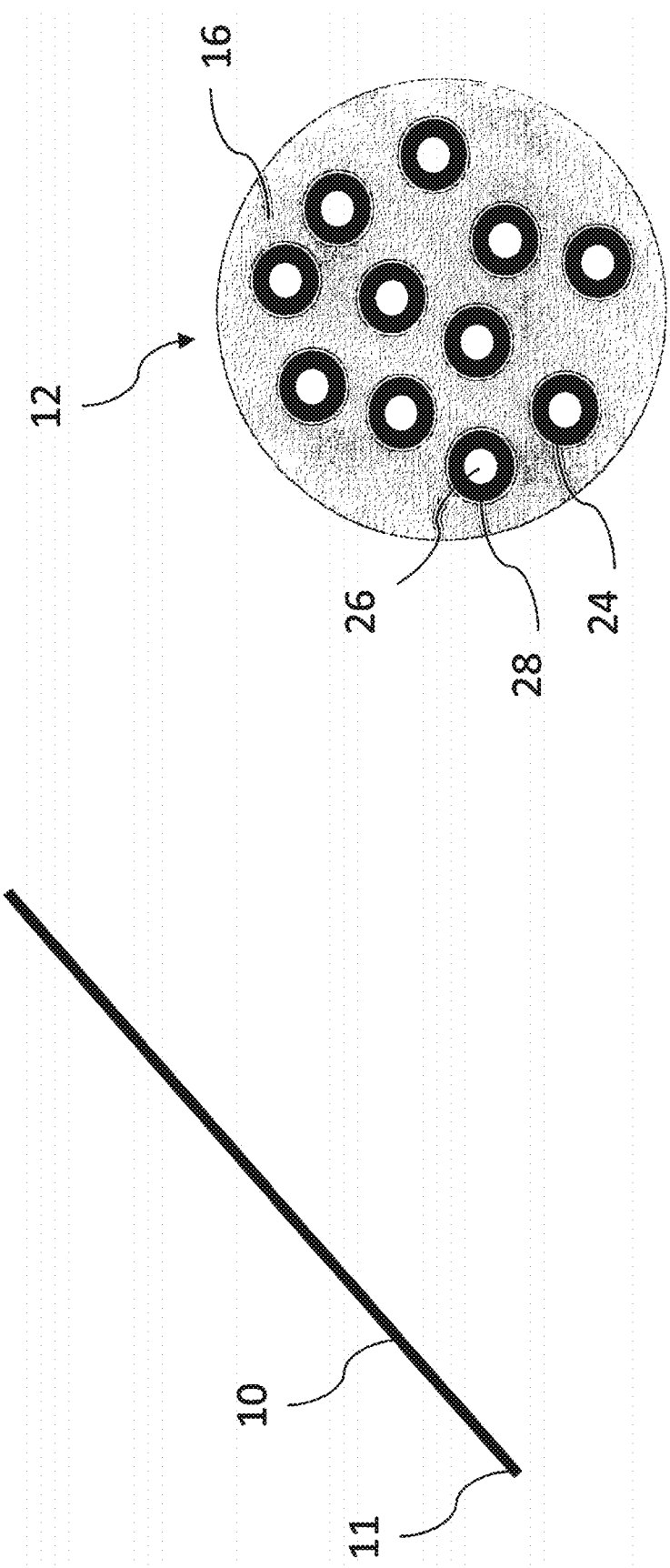

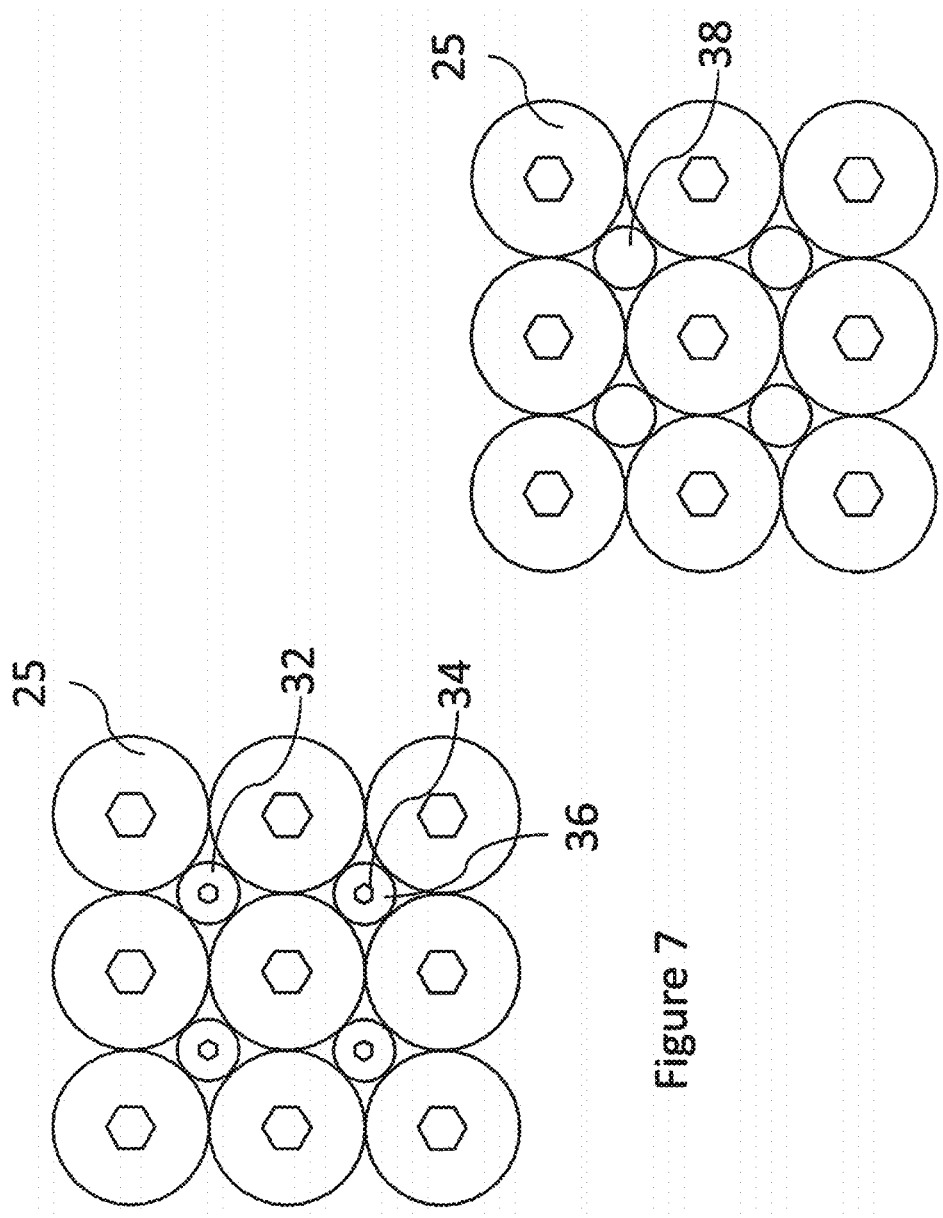

WEAR RESISTANT COATING

RELATED APPLICATION

This application is a continuation of U.S. patent application Ser. No. 14/504,199, filed on Oct. 1, 2014, which claims the benefit of U.S. Provisional Application No. 61/885,704, filed Oct. 2, 2013, both of which are incorporated herein by reference in their entireties.

TECHNICAL FIELD

The disclosure herein generally but not exclusively relates to a brazing rod for forming a wear resistant coating on a substrate by a brazing process, a method for making a brazing rod for forming a wear resistant coating on a substrate by a brazing process, a wear resisting coating on a substrate, and a method for forming a wear resistant coating on a substrate.

BACKGROUND

Hardfacing is a process of applying a wear resistant material to a surface to improve the wear properties of the surface or repair the surface. Hardfacing is currently used in relation to industrial, excavation and drilling tools, for example.

Generally, there is a long felt need for better, harder and more consistent wear resistant materials that can be applied relatively easily.

SUMMARY

Disclosed herein is a brazing rod for forming a wear resistant coating on a substrate by a brazing process. The brazing rod comprises a composite material comprising a plurality of round particles bound together by a binding material. Each of the plurality of round particles comprises a round outer layer encapsulating a wear resistant element.

In an embodiment, the binding material comprises a metallic binding material. The binding material may comprise a monolithic matrix of the metallic binding material.

In an embodiment, the binding material penetrates the round outer layer of each of the plurality of round particles.

In an embodiment, the wear resistant element of each of the plurality of round particles has a coating metallurgically bonded thereto, the coating being metallurgically bondable to the binding material. The coating may be metallurgically bonded to the binding material.

In an embodiment, the binding material is metallurgically bonded to at least one of an inner surface and an outer surface of the round outer layer of each of the plurality of round particles. The binding material may be metallurgically bonded to a plurality of inner surfaces and the plurality of outer surfaces of the round outer layer of each of the plurality of round particles.

Generally, the round outer layer of each of the plurality of round particles controls the spacing and/or the packing of the wear resistant elements of the plurality of round particles within the wear resistant coating when applied. The round outer layer of each of the plurality of round particles may control the spacing and/or the packing of the wear resistant elements of the plurality of round particles within the brazing rod. Consequently, the thickness of the round outer layer may be chosen to control the number of wear resistant elements per unit volume of the wear resistant coating. The thickness of the round outer layer may be chosen to control the wear resistant element's uniformity of distribution within the wear resistant coating.

In an embodiment, for each of the plurality of round particles the round outer layer has a density greater than that of the wear resistant element. Consequently, the plurality of round particles are less buoyant in the molten binding material during the brazing process than a plurality of wear resistant elements free of the round outer coatings. The distribution of the elements in the wear resistant coating may be consequently better than if the round outer layers were absent.

In an embodiment, the metallic binding material may comprise a braze metal. The braze metal may comprise a braze alloy.

In an embodiment, the volume fraction of the plurality of round particles within the composite material is at least 0.05. The volume fraction of the plurality of round particles within the composite material may be no more than 0.85.

In an embodiment, the wear resistant element of each of the plurality of round particles has an ISO 6106 mesh size of at least 18. The wear resistant element of each of the plurality of round particles may have an ISO 6106 mesh size of no more than 120. In an alternative embodiment, the wear resistant element of each of the plurality of round particles may have an ISO 6106 mesh size of no more than 80.

In an embodiment, the round outer layer comprises another composite material. The other composite material may be a cermet. The cermet may be a polycrystalline cermet.

In an embodiment, the wear resistant element of each of the plurality of round particles comprises a material having a Vickers hardness greater than at least one of 20 GPa and 40 GPa. Wear resistant elements having a Vickers hardness of greater than 40 GPa are, in the context of this document, super hard materials.

In an embodiment, each of the plurality of round particles has an elastic modulus of greater than 200 GPa.

In an embodiment, the plurality of round particles has a close packed arrangement.

In an embodiment, the composite material comprises another plurality of particles that occupy a plurality of interstices between the plurality of round particles. The other plurality of particles may be round. The other plurality of particles may comprise a first plurality of particles having a first mean diameter and a second plurality of particles having a second mean diameter that is less than the first mean diameter. The second mean diameter may be less than 10% of the first mean diameter. The second plurality of particles may further increase the volume fraction of particles within the wear resistant coating when formed, which may improve the wear resistance of the wear resistant coating.

Disclosed herein is a method for making a brazing rod for forming a wear resistant coating on a substrate by a brazing process. The method comprises the step of forming a mixture comprising a plurality of round particles, and a binding material for binding the plurality of round particles. Each of the plurality of round particles comprises a round outer layer encapsulating a wear resistant element. The method comprises the step of configuring the mixture into a rod shape. The method comprises the step of binding the plurality of round particles with the binding material by heating the mixture configured into a rod shape.

In an embodiment, the binding material comprises a metallic binding material. The step of binding the plurality of round particles may comprise the step of heating the mixture configured as a rod shape wherein the metallic binding material is melted to form a monolithic matrix of metallic binding material.

An embodiment comprises the step of the metallic binding material so melted penetrating the round outer layer of each of the plurality of round particles.

An embodiment comprises the step of metallurgically bonding the binding material to at least one of an inner surface and an outer surface of the round outer layer of each of the plurality of round particles. The binding material may be metallurgically bonded to the plurality of inner surfaces and the plurality of outer surfaces of the round other layer of each of the plurality of round particles.

In an embodiment, the wear resistant element of each of the plurality of round particles has a coating metallurgically bonded thereto, the coating being metallurgically bondable to the wear resistant coating binder.

An embodiment comprises the step of coating the wear resistant element of each of the plurality of round particles with the coating metallurgically bondable to the metallic binding material.

An embodiment comprises the step of the binding material penetrating the round outer layer of each of the plurality of round particles and forming a metallurgical bond with the coating.

In an embodiment, for each of the plurality of round particles the round outer layer has a density greater than that of the wear resistant element.

In an embodiment, configuring the mixture into a rod shape comprises forming a cylinder comprising the mixture.

In an embodiment, forming the mixture comprises including a fugitive binder in the mixture. In the context of this document, the fugitive binder comprises a binding substance that escapes the mixture during the brazing process. The fugitive binder may be for temporarily binding the mixture during the step of configuring the mixture as a rod. Without the fugitive binder, the mixture may not be configurable into a rod shape.

In an embodiment, the metallic binding material may comprise a braze metal. The braze metal may comprise a braze alloy.

In an embodiment, the volume fraction of the plurality of round particles within the mixture is at least 0.05. The volume fraction of the plurality of round particles within the mixture may be no more than 0.85.

In an embodiment, the round outer layer comprises a composite. The composite may be a cermet. The cermet may be a polycrystalline cermet.

In an embodiment, the wear resistant element of each of the plurality of round particles has an ISO 6106 mesh size of at least 18. The wear resistant element of each of the plurality of round particles has an ISO 6106 mesh size of and no more than 80. The wear resistant element of each of the plurality of round particles has an ISO 6106 mesh size of and no more than 120.

In an embodiment, the wear resistant element of each of the plurality of round particles comprises a material having a Vickers hardness greater than at least one of 20 GPa and 40 GPa.

In an embodiment, each of the plurality of round particles has an elastic modulus of greater than 200 GPa.

In an embodiment, the step of configuring the mixture as a rod shape comprises at least one of the steps of extruding the mixture, and using metal injection molding.

In an embodiment, the step of configuring the mixture as a rod shape comprises the step of disposing the mixture in a mold configured for forming the brazing rod. The mixture may be mixed before being disposed in the mold, or while in the mold.

In an embodiment, forming the mixture comprises including in the mixture another plurality of particles that occupy a plurality of interstices between the plurality of round particles. The other plurality of particles may be round. The other plurality of particles may comprise a first plurality of particles having a first mean diameter and a second plurality of particles having a second mean diameter that is less than the first mean diameter. The second mean diameter may be less than 10% of the first mean diameter. The second plurality of particles may further increase a volume fraction of particles.

Disclosed herein is a wear resistant coating on a substrate. The wear resistant coating comprises a composite material comprising a plurality of round particles bound together by a binding material. Each of the plurality of round particles comprises a round outer layer encapsulating a wear resistant element.

In an embodiment, the binding material comprises a metallic binding material. The metallic binding material may comprise a braze metal. The braze metal may comprise a braze alloy.

In an embodiment, the plurality of round particles have a close packed arrangement. Another plurality of particles may occupy a plurality of interstices between the plurality of round particles.

Disclosed herein is a wear resistant coating on a substrate, the wear resistant coating comprising:

a composite material comprising a plurality of round particles bound together by a binding material, wherein each of the plurality of round particles comprises a round outer layer encapsulating a wear resistant element, the binding material penetrates the round outer layer and is metallurgically bonded to a coating metallurgically bonded to the wear resistant element of each of the plurality of particles, wherein the binding material is metallurgically bonded to at least one of an inner surface and an outer surface of the round outer layer of each of the plurality of round particles.

In an embodiment, the binding material comprises a metallic binding material. The binding material may comprise a monolithic matrix of the metallic binding material.

A fifth aspect of the invention provides a method of forming a wear resistant coating on a substrate. The method comprises the step of heating a brazing rod in accordance with the above disclosure to form a brazing rod melt. The method comprises flowing the brazing rod melt over a surface of the substrate.

An embodiment comprises the step of the binding material penetrating the round outer layer of the plurality of round particles and forming a metallurgical bond with a coating.

In an embodiment, the wear resistant element of each of the plurality of round particles has a coating metallurgically bonded thereto, the coating being metallurgically bondable to the wear resistant coating binder.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which:

FIG. 1 shows an embodiment of a brazing rod.

FIG. 2 schematically shows a detail of a composite material constituting the brazing rod of FIG. 1.

FIGS. 7-9 show schematic diagrams where interstices of a plurality of round particles are occupied with another plurality of particles.

DESCRIPTION OF EMBODIMENTS

Figure 4:
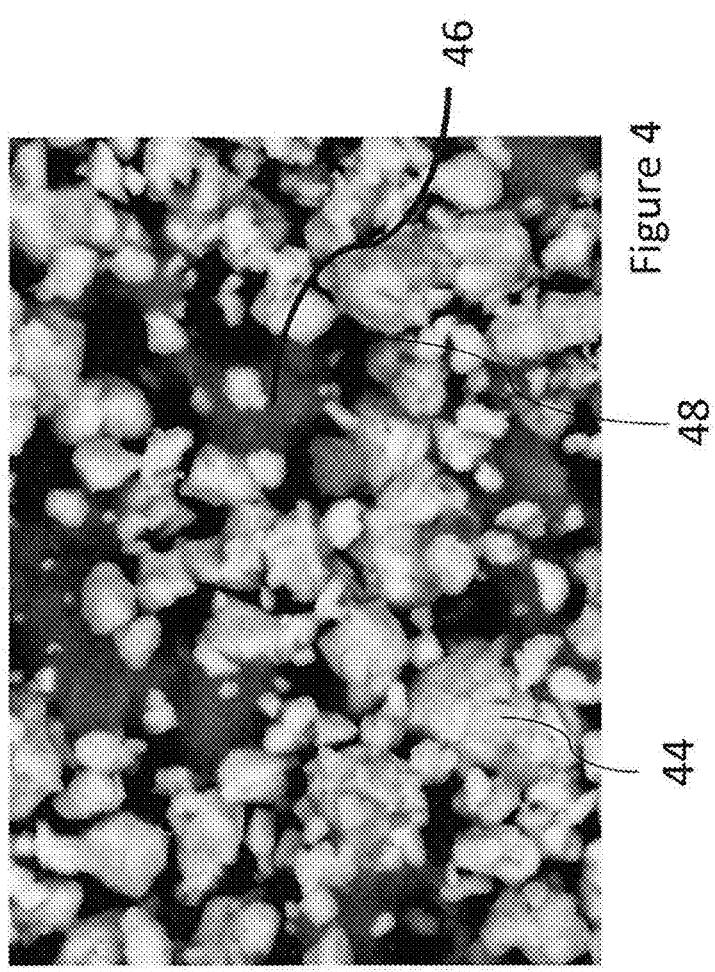
FIG. 4 is a Back Scattered Scanning Electron Micrograph of an encapsulant.

FIG. 1 shows an embodiment of a brazing rod generally indicated by the numeral 10. The brazing rod 10 is for forming a wear resistant coating on a substrate by a brazing process. FIG. 2 schematically shows a detail of a composite material 12 constituting the brazing rod 10. The composite material 12 has a plurality of round particles 24 distributed in a binding material 16 in the form of a metallic binding material. Each of the plurality of round particles 24 comprises a round outer layer 28 encapsulating a wear resistant element 26.

In one example of a brazing process a surface of a steel substrate is optionally cleaned by application of a grinder. Alternatively, a chemical cleaning agent, or generally any suitable cleaning process may be used. A flame, for example an oxyacetylene flame, may then be optionally applied to the substrate to preheat it. A tip 11 of the brazing rod 10 is then placed onto the preheated surface and within the flame. Subsequently, the tip of the brazing rod 10 is heated and the binding material 16 becomes fluid. The brazing rod melt comprising the fluid and the particles therein flow over the surface of the substrate. The fluid solidifies on cooling to form a wear resistant coating comprising the plurality of round particles distributed in and bound by the metallic binding material. Through diffusion, the wear resistant coating is atomically bonded to the surface of the substrate. Generally any suitable brazing process may be used, for example Tungsten Inert Gas (TIG) techniques may be alternatively employed.

The substrate may generally be any suitable substrate, examples of which include a drill bit used by the mining or another industry, other down-hole equipment, the teeth of a bucket for an excavator, a chisel, and a blade.

For the brazing rod 10 of FIG. 1, but not necessarily for all embodiments of a brazing rod, the round outer layer 28 has a density greater than that of the wear resistant element 26. The average density of the plurality of round particles 24 is greater than the average of the wear resistant elements 26. Were the wear resistant elements naked or individual, then they may float upwards through the molten binding material during the brazing process resulting in an uneven concentration of wear resistant elements in the wear resistant coating, which is generally undesirable. In the present embodiment, the binding material penetrates the round outer layers, reducing the buoyancy of the plurality of round particles.

In this embodiment, the round outer layer is a composite in the form of a cermet, with a theoretical density generally in the range of 15-19 g·cm$^{-3}$. The cermet comprises comprise cobalt. Cobalt has a density of around 8.9 g·cm$^{-3}$. The wear resistant element is a diamond, which has a density of around 3.5 g·cm$^{-3}$.

The binding material may, for example, be generally any suitable brazing metal, including copper, tin, silver, cobalt nickel, cadmium, manganese, zinc, cobalt or an alloy thereof. The binding material may also comprise chromium that hardens the alloy formed. The wear resistant coating binder may also contain silicon and/or boron powder to aid in fluxing and deposition characteristics. In the present embodiment, the binding material comprise nickel, chromium, boron and silicon. Nickel may constitute 88%-95% by weight, chromium may constitute 0%-12%, boron may constitute 0%-1% and silicon may constitute 0%-1%.

Figure 3:
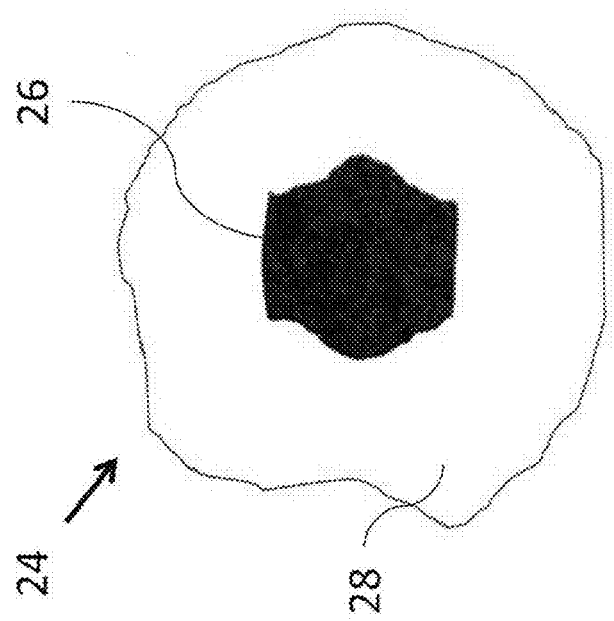
FIG. 3 shows a cross section of a representative particle of a plurality of round particles within the composite material of FIG. 2.

FIG. 3 shows a cross section of a representative particle 24 of the plurality of round particles, the wear resistant element being indicated by the numeral 26 and the round outer layer ("encapsulant") being indicated by the numeral 28. The wear resistant element 26 is in this embodiment a super hard material, which is conventionally understood to be a material having a Vickers hardness of greater than 40 GPa. Examples of super hard materials that may be used include but are not limited to synthetic diamond, natural diamond and cubic boron nitride. However, alternative embodiments do not have elements comprising super hard material. The element in this embodiment has an indentation resistance of greater than 20 GPa and an elastic modulus of greater than 200 GPa. The element may be crystalline or polycrystalline. Other examples of suitable wear resistant element materials include silicon reacted polycrystalline diamond, catalyst-free polycrystalline diamond, alumina, partially stabilized zirconia, silicon carbide and silicon nitride. Generally, but not necessarily, wear resistant elements with a Vickers hardness exceeding 20 GPa may be used. The element 26, in this but not in all embodiments, is synthetic diamond. The element typically has a relatively low density of less than 6 Mgm$^{-3}$.

In this but not necessarily in all embodiments, the round outer layer 28 comprises a polycrystalline cermet in the form of tungsten carbide particles sintered with cobalt particles. A cermet is generally a composite material composed of ceramic particles (for example an oxide, boride or carbide) bound together with a metallic material (examples of which include nickel, molybdenum and cobalt). The encapsulant 28 differs from the wear resistant element 26 in that, in this but not necessarily in all embodiments, it is of a lower hardness. The encapsulant is in this but not necessarily in all embodiments polycrystalline and prior to its fabrication into the brazing rod may be present in different forms such as having unreacted and un-bonded adjacent grains, through to fully sintered with low-to-no measurable porosity. Alternatively, the round outer layer 28 may comprise a metal matrix composite, for example polycrystalline tungsten or molybdenum in a metal binder such as cobalt, nickel or iron.

FIG. 4 is a Back Scattered Scanning Electron Micrograph of the encapsulant 28. In this micrograph the polycrystalline material, in this case tungsten carbide 44 has sintered and bonded neighbouring grains. A sintering aid material, in this case cobalt 46 has partly softened by heating during the formation of the plurality of round particles to form the encapsulant or pellet and in so doing has 'bridged' and joined to itself and the polycrystalline material 44. In this particular example the structure is not fully densified and voids or holes 48 are present within the structure. A semi-porous structure, with small pores and high-capillary forces may be advantageous in terms of metallurgical bonding during the brazing process. Density levels of the material used to form the grains within the encapsulant are higher than the super hard element (>6Mgm$^{-3}$). The overall density and hardness of the encapsulant is dependent on the material used and the degree of sintering. Independent of the degree of sintering, the encapsulant significantly increases the density of the plurality of round particles. In the case where sintering is required, metals may be used in powder form as an aid to sintering. Examples of the materials used within the polycrystalline material include but are not limited to tungsten and tungsten carbide. Examples of the sintering aids that may be used include but are not limited to cobalt, nickel and iron. Methods used to encapsulate the elements with the encapsulant generally, but not necessarily promote high degrees of sphericity, even when the elements are not round or not spherical in nature, for example cuboid, acicular or elliptical. The majority of pellets used (>50%) contain one element. The majority (>50%) of the elements will be encapsulated within the encapsulant, so there will be a minority of examples (<50%) where the element is not encapsulated by the encapsulant at all.

In the examples of FIGS. 1 and 2 but not necessarily in all examples, the element 26 is metallurgically bonded to a coating intermediate of the element 26 and the encapsulating material 28. The coating may be deposited using different techniques, including but not limited to chemical vapor deposition, physical vapor deposition and metallization. Such techniques provide a coating that is generally of the order of one to a few microns thick; e.g. 1-2 microns. Examples of coating materials include but are not limited to titanium and silicon where the element 26 is a diamond.

Figure 5:
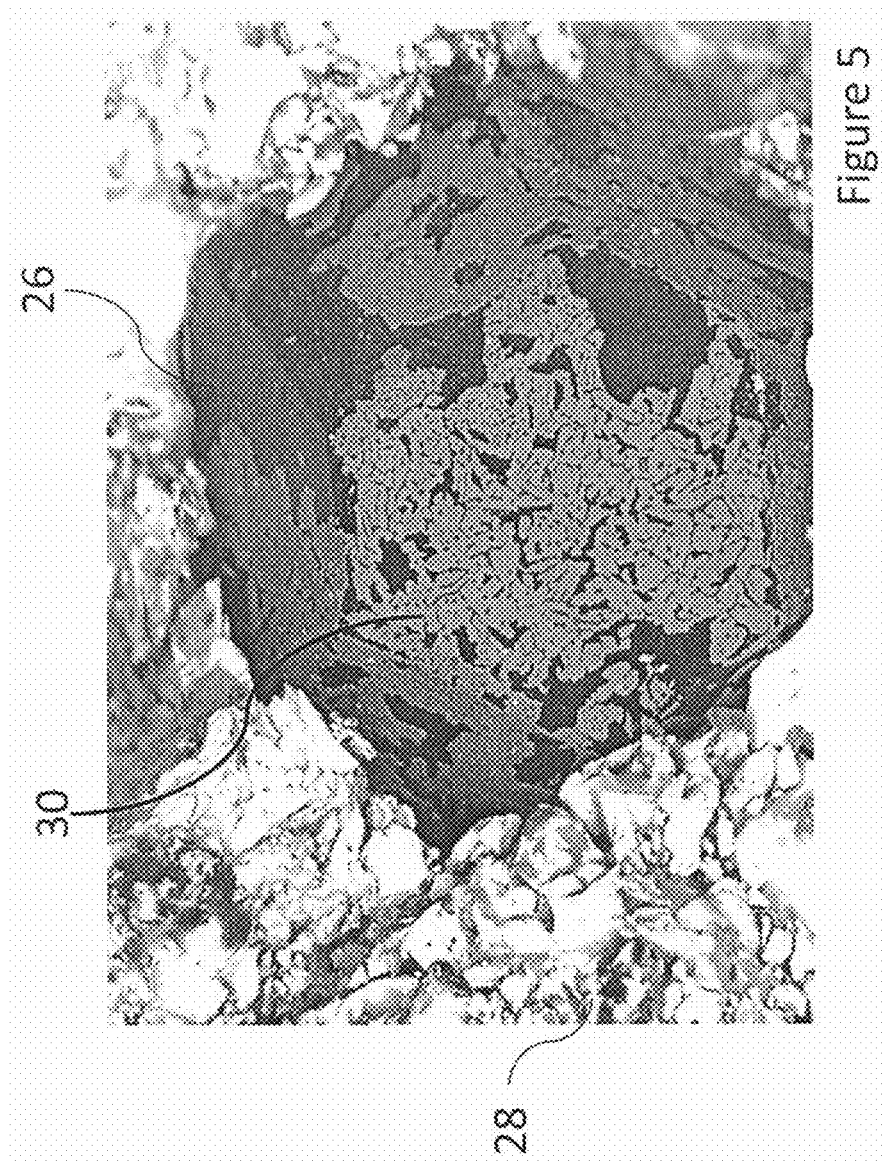
FIG. 5 is a Back Scattered Scanning Electron Micrograph of a fracture through one of the plurality of round particles.

FIG. 5 is a Back Scattered Scanning Electron Micrograph of a fracture through the particle 24. The revealed coating 30 intermediate of the elements 26 and the encapsulating materials is, in this but not necessarily in all embodiments, a metallic coating comprising titanium. In the micrograph of FIG. 5, the titanium 30 that was originally completely surrounding and bonded to the element 26 has been partly removed on fracture. The opposing fracture surface or pocket (not shown) contains remnants of the titanium, indicating equivalent metallurgical bonding between the titanium and the element, and the titanium and the encapsulant. The volume of the coating is much less (generally but not necessarily less than 1/100) of that of the element 26. The effect of the coating 30 does not in this embodiment, but not necessarily in all embodiments, significantly contribute to the overall density of the element 26. The coating 30 may provide for a stronger bond between the element 26 and the encapsulating material 28, together with thermal and chemical protection of the element 26 during the manufacture of the brazing rod.

Figure 6:
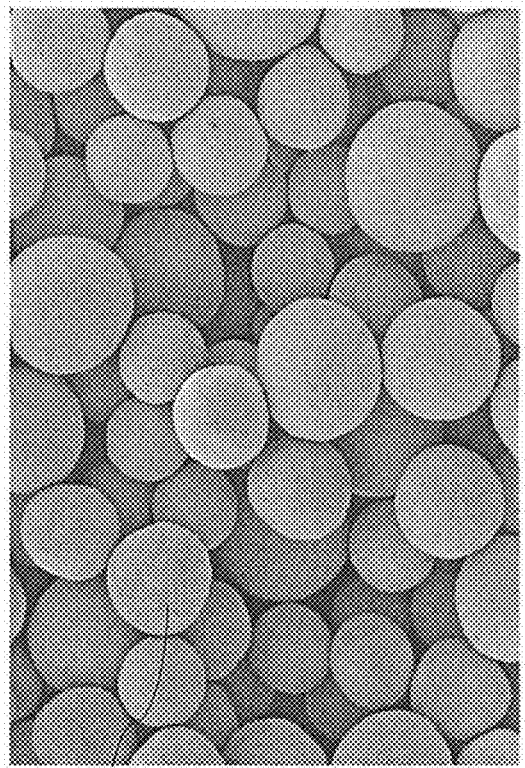
FIG. 6 shows a plurality of round particles.

FIG. 6 shows a plurality of round particles. A majority of the plurality of round particles 24 in this but not necessarily in all embodiments each have a diameter of between 70% and 130% of a mean diameter of the plurality of round particles. In other embodiments, the majority of the plurality of round particles may each have a diameter of between 80% and 120% of a mean diameter of the plurality of round particles. In yet other embodiments, the majority of the plurality of round particles may each have a diameter of between 90% and 110% of a mean diameter of the plurality of round particles. In still yet other embodiments, the majority of the plurality of round particles may each have a diameter of between 95% and 105% of a mean diameter of the plurality of round particles. The applicants are of the opinion that the narrower the distribution of diameters the less defects a close packed structure of the plurality of round particles will have and the better the performance of the wear resistant coating. A bulk material or powder (hereafter referred to as "powder") comprising a plurality of round particles having a narrow distribution of diameters may, however, be relatively more expensive to produce.

FIG. 7 shows a schematic diagram where the interstices of a plurality of round particles 25 in a brazing rod or wear resistant coating, are occupied with another plurality of particles, such as 32. Each of the other plurality of particles has an element 34 of super hard material encapsulated by an encapsulant 36, as described herein in respect to the plurality of particles.

FIG. 8 shows a schematic diagram where the interstices of a plurality of round particles, such as 25, in a brazing rod (or a wear resistant coating formed using the brazing rod) are occupied by the other plurality of particles, such as 38, which do not have an encapsulant. In this case but not necessarily in all cases, the other plurality of particles are harder than the encapsulant.

Figure 9:
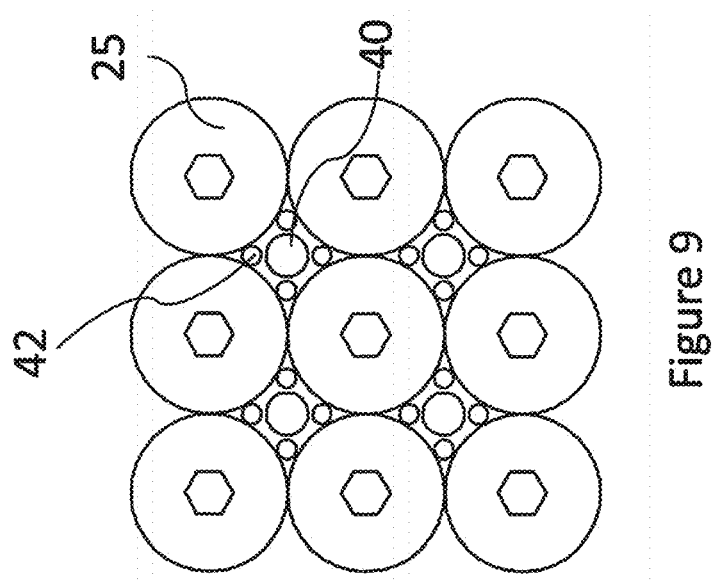

FIG. 9 shows a schematic diagram where the interstices of a plurality of round particles, such as 25, in a brazing rod (or a wear resistant coating formed using the brazing rod) are occupied by the other plurality of particles which comprise a first plurality of particles, such as particle 40, having a first mean diameter and a second plurality of particles, such as particle 42, having a second mean diameter that is less than the first mean diameter. The second mean diameter is in this, but not all embodiments, less than 10% of the first mean diameter. The inclusion of the second plurality of particles may result in better closure of the interstices. In one example, the plurality of round particles have a mean diameter of 0.333 mm, the first plurality of particles (primary interstitial particles) have a mean diameter of 0.098 mm and the second plurality of particles (secondary interstitial particles) have a mean diameter of 0.008 mm. The other plurality of particles may comprise a third plurality of particles (tertiary interstitial particles) that may have a mean diameter that is less than the second mean diameter, say 0.001 mm.

The other plurality of particles may be constructed from different materials such as diamond, tungsten carbide, tungsten, alumina, silicon carbide and silicon nitride or generally any suitable material. Their size and distribution may be selected to maximize the packing density and wear behavior when deposited within the hard facing consumable. In this embodiment, they are tungsten carbide.

In the FIGS. 7 to 9, the plurality of round particles have a close packed arrangement. Because the particles are round they are able to adopt a close packed arrangement that may be denser than other packing arrangements. Consequently, the number of elements per unit volume may be greater than for brazing rods and wear resistant coatings having particles that are not in a close packed arrangement. Increasing the number of elements per unit volume generally improves the coatings wear resistance. Close packing may improve the capillary action that moves the molten braze material through the plurality of round particles during binding in which the braze material infiltrates the interstices between the plurality of round particles. Consequently, close packing may provide relatively high structural integrity by relatively better joining of the plurality of round particles and largely avoid defects that may be encountered in brazed material systems caused by inter-particle distances that are too big. Perfect close packed arrangements-generally a face centered cubic arrangement, but in some embodiments a hexagonal close packed arrangement-may be achieved when the plurality of round particles are identical perfect spheres. The close packed arrangement of the plurality of round particles will generally but not necessarily have defects because the plurality of round particles generally deviate from perfect spheres and have various sizes. Nevertheless, the benefits provided by a defective close packed arrangement of the plurality of round particles may approach those of a perfect close packed arrangement.

In the embodiments of FIGS. 1 and 2, for example, the volume fraction of the plurality of round particles is at least 0.05 and no more than 0.85. The wear resistant element of each of the plurality of round particles has in the present embodiment an ISO 6106 mesh size of at least 18 and no more than 120. In another embodiment (otherwise identical to that of FIGS. 1 and 2, for example), the wear resistant element of each of the plurality of round particles may have an ISO 6106 mesh size of at least 18 and no more than 80.

ISO stands for the International Standards Organization, and documents describing standard 6106 are publically available.

Figure 10:
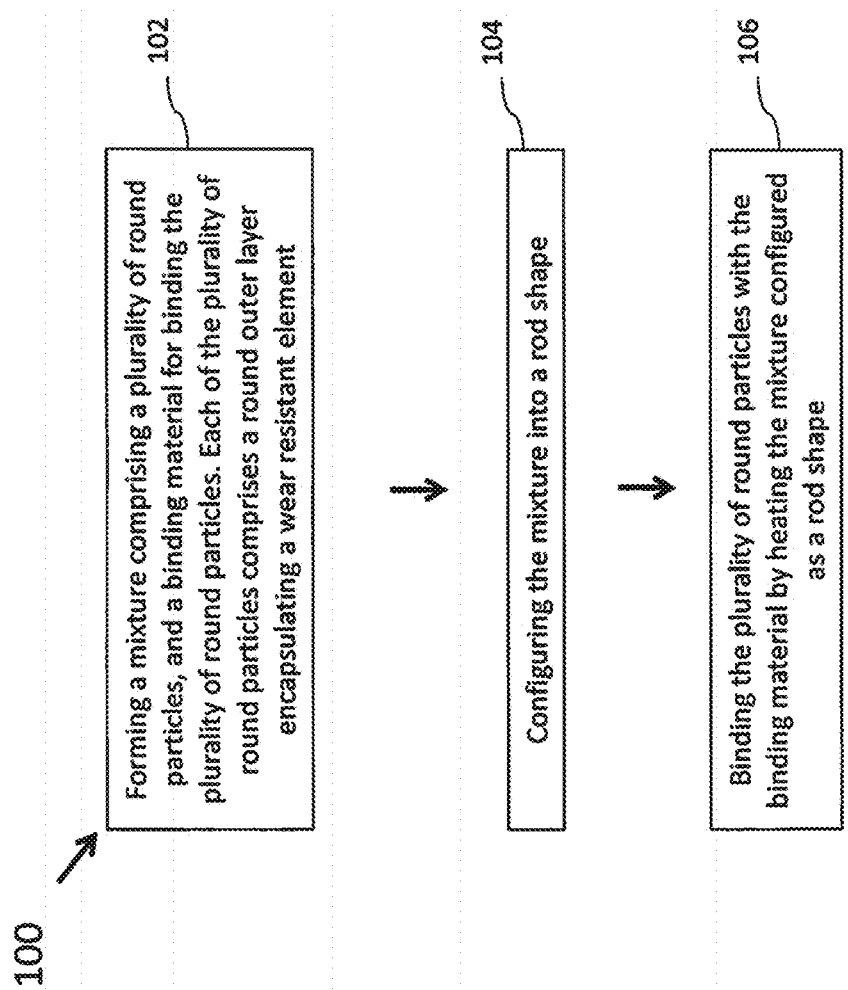
FIG. 10 shows a flow diagram for a method for making the brazing rod.

FIG. 10 shows a flow diagram for a method 100 for making the brazing rod 10. In a step 102 of the method, a mixture is formed, the mixture comprising the plurality of round particles 24, and the binding material 16 for binding the plurality of round particles. Each of the plurality of round particles 24 comprises a round outer layer 28 encapsulating a wear resistant element 26. The method 100 comprises the step 104 of configuring the mixture as a rod shape. The method comprises the step 106 of binding the plurality of round particles 24 with the binding material 16 by heating the mixture configured as a rod shape.

In this embodiment, configuring the mixture into a rod shape comprises forming a cylinder comprising the mixture. The cylinder comprising the mixture is solid, however, it may be hollow in an alternative embodiment.

The mixture may be configured as a rod by using an extrusion process, or using metal injection molding for example. This may allow relatively high production capacity, lower molding costs, and allow the fabrication of complex shapes. Generally, any suitable process may be used to form a cylinder comprising the mixture.

Figure 11:
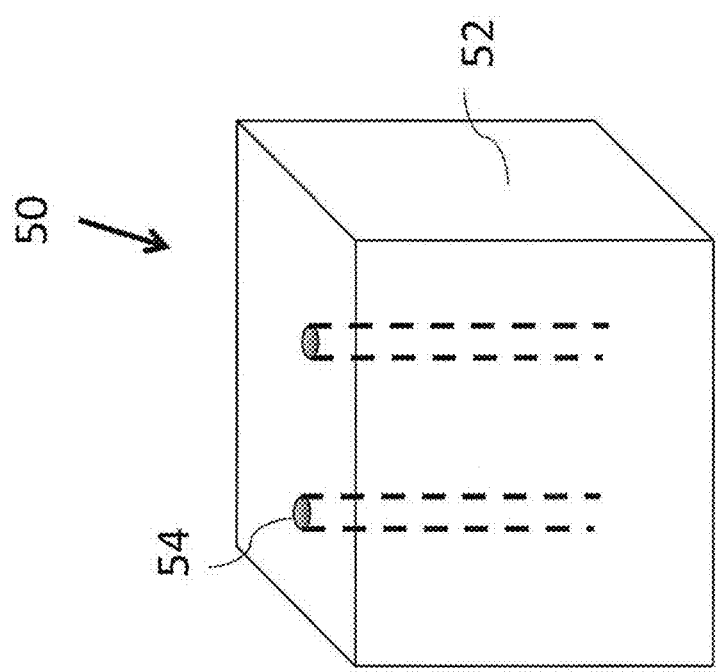
FIG. 11 shows an example of a mold configured for forming the brazing rod.
Figure 13:
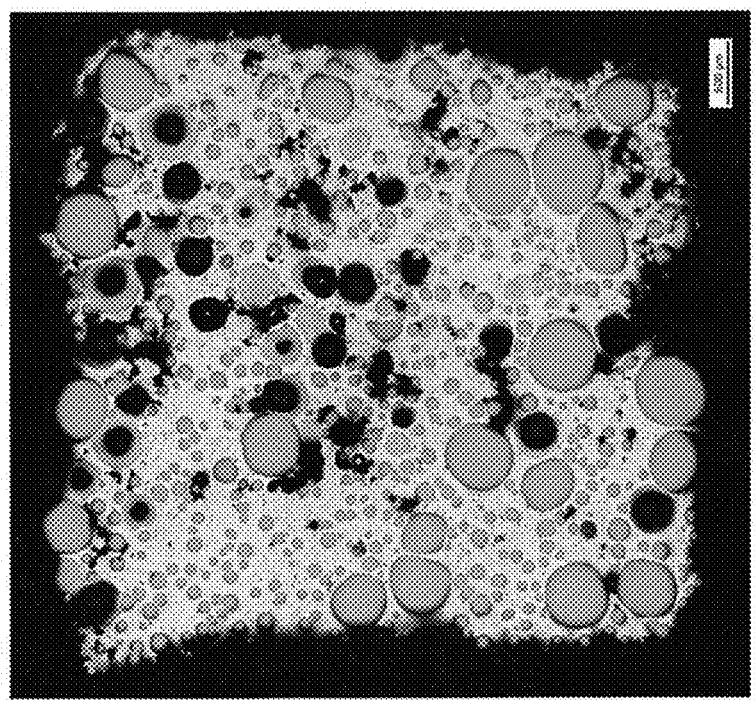
FIG. 13 shows a micrograph of a sample from another embodiment of a brazing rod.

In the present embodiment, however, the mixture is disposed in a mold configured for forming the brazing rod. FIG. 11 shows an example of a mold 50 configured for forming the brazing rod 10. In this embodiment, the mold 50 is a graphite block 52 with at least one aperture 54 formed therein for receiving the mixture. The at least one aperture is configured to form a cylinder. The mold may alternatively be formed of sand, ceramic-based materials, or generally any suitable material. In another adaption, a simple V or U shape may be constructed using steel plates. Alternatively, the mold may comprise a single plate having an upwardly orientated face in which grooves are formed for receiving the mixture. The mold may comprise sheet metal stamped to form at least one elongated recess. The mold having the mixture disposed therein is in this, but not necessarily in all embodiments, then placed in a furnace for the step of heating the mixture configured as a rod. Furnace types may include, for example, batch and pusher-type furnaces. The furnace may have an unprotected, neutral, or protective atmosphere comprising hydrogen, for example.

The binding material comprising the metallic binding material is melted by the heating. In this but not necessarily in all embodiments, the mold is heated until after the binding material is wholly melted. The heating time and the temperature of the furnace are selected for the binding material. For example, for the present embodiment in which a nickel alloy binding material is used, the molds may be kept in a furnace having an internal temperature of between 900-1200 degrees centigrade for five to 60 minutes, for example. Wholly melted binding material is different than partially melted binding material and merely softened binding material. For partially melted binding material, only a portion (e.g. the edges or outer layer) of a majority of the plurality of particles of binding material may be melted. The binding material so wholly melted penetrates a plurality of interstices between the plurality of round particles and on cooling forms a matrix in the form of a monolithic matrix that binds the plurality of round particles. The filling of interstices by the binding material improves the strength of the resulting composite and consequently the robustness of the rod. The binding material may also, as in this embodiment, form a metallurgical bond with any interstitial particles that may be included.

Figure 12:
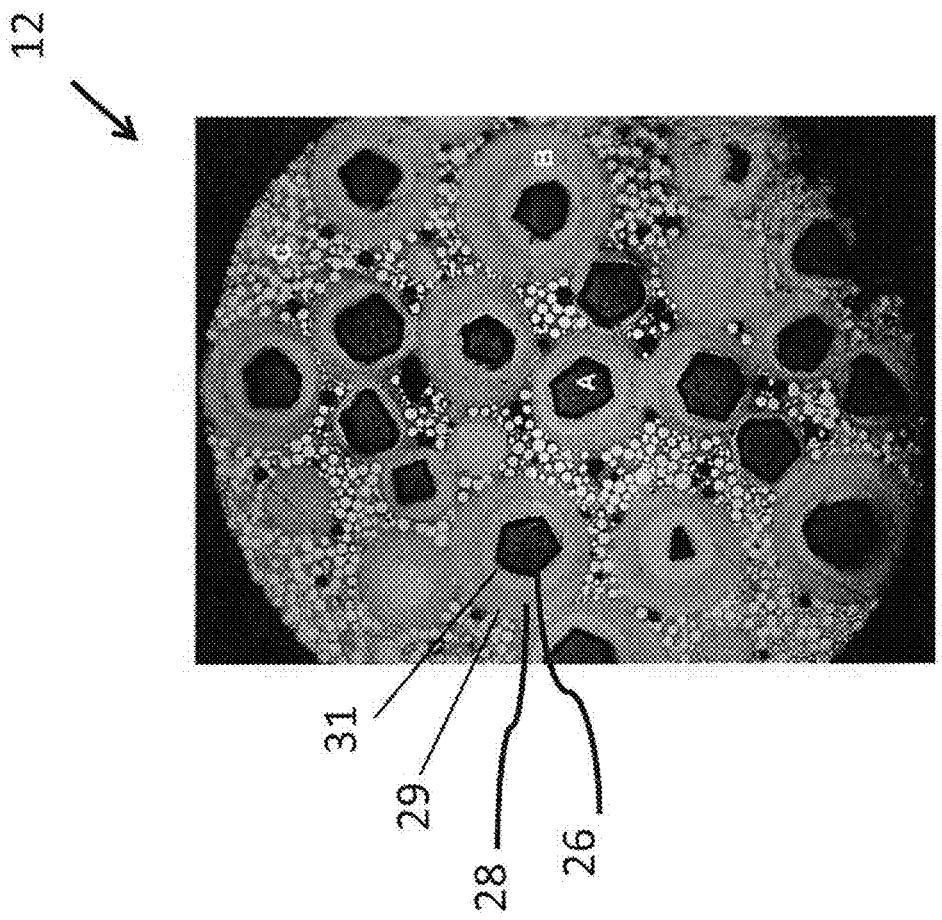
FIG. 12 shows a micrograph of the composite material of the brazing rod of FIG. 1 that may be formed by the method.

The round outer layer of each of the plurality of round particles generally may comprise a porous or skeletal structure, in which internal surfaces define internal voids and/or passageways. The binding material penetrates the porous or skeletal structure, and may fill the internal voids and/or passageways, to form a web within the round outer layer of at least a majority of the plurality of round particles. This results in a strong mechanical attachment to the plurality of round particles. FIG. 12 shows a micrograph of a composite material of the rod 10 that may be formed by the method 100. The round outer layer 28 comprises an outer shell 29 penetrated by the binding material and an inner shell 31 that is not penetrated by the binding material. In alternative embodiments, the binding material in the brazing rod penetrates to the coating 30 intermediate of the elements 26 and the encapsulating material 28. In the wear resistant coating when formed, the binding material may, as in the present embodiment, penetrate to the coating 30 intermediate of the elements 26 and the encapsulating material. The binding material is metallurgically bonded with the coating 30 intermediate of the element 26 and encapsulating material. Consequently, the wear resistant elements, in this embodiment diamonds, are metallurgically bonded to the binding material by way of the intermediate coating 30. This may generally improve the attachment of the wear resistant elements, especially when they are exposed by wear and mere mechanical attachment may be insufficient for their retention in the coating. This may improve the wear resistant coating's performance and life.

The solidified binding material is, in this but not necessarily in all embodiments, also metallurgically bonded to the plurality of round particles (which may comprise metal), at the outer surfaces of the plurality of round particles, and at internal surfaces of the plurality of round particles. This may further increase the strength of the rod and final wear resistant coating.

The metallurgical bonds disclosed herein may comprise diffused atoms and/or atomic interactions. Under such conditions, the component parts may be "wetted" to and by the binding material.

Rods for which the binding material was not wholly melted may generally be too fragile for handling, transportation and use, because the binding material may still be a powder or powder like.

The various metallurgical bonds formed may result in some of the following advantages:

The plurality of round particles, and any interstitial particles, in the brazing rod are wetted prior to the formation of the wear resistant coating, which may make the formation of the wear resistant coating easier and improve the wear resistant coating when formed;

the brazing rod may be stronger and/or more rigid which may make the brazing rods more robust for transportation and handling; and The melt may be uniform and form a superior coating because the binding material and wear elements are not segregated in the rod.

In other embodiments, however, the binding material is merely softened by heating to provide a binding effect.

While it is possible to include all of the ingredients for a rod into the mold in a dry state, density and shape differences will tend to segregate them. Segregation may be ameliorated by thorough mixing using a fugitive binder. Prior to loading the mold, the fugitive binder, the particles of the binding material 16, the plurality of round particles, and the other plurality of particles in those embodiments that use them, are combined and mixed providing a uniform distribution of the plurality of round particles, particles of binding material and the other plurality of particles within the resulting mixture. The fugitive binder, the particles of the binding material 16, the plurality of round particles, and the optional other plurality of particles may be mixed in an industrial blade mixer, tumbled in a tumble mixer, or generally mixed using any suitable method. Examples of fugitive binders include but are not limited to mineral oil, polyethylene glycol, resin (an example of which includes, but is not limited to RESINOX manufactured by OXYCHEM), and methylcellulose based materials. The fugitive binder may be at least one of decompose, combust, or evaporate when heated during the heating of the mixture to escape the mixture. Binders may enable a rod shape to be constructed using metal injection molding or extrusion. Fluxing agents may also be added to the mixture. These may be self fluxing and/or chemical fluxing agents. Examples of self fluxing agents including silicon and boron, while chemical fluxing materials may be based on borates. A fluxing agent and deoxidization in the form of silico manganese 2% carbon (ECKEM CHEMICALS or CHEM ALLOY) may be added to the mixture.

Applications

The brazing rod 10 may be used to form a wear resistant coating on any suitable substrate. Some suggested applications are now described, however it will be appreciated that there are many applications of the wear resistant coating.

Stabilizers are used in the exploration and production of oil and gas. Their function is to provide stability to the drill bit and maintain dimensional control of the hole. Large sections of the stabilizer are in direct contact with the walls of the hole or steel casing. Through rotation of the drill string and progressive drilling, protective elements and hard facings are prone to wear which may eventually result in repair, end-of-life or dimensionally unacceptable diameters. Stabilizes having a wear resistant coatings described herein applied thereto may reduce or eliminate these issues.

Rotary bi- and tri-cone drill bits are manufactured with protrusions or "teeth" that are machined from parent steel. A drill bit having a wear resistant coating described herein applied thereto may have increased life and exhibit reduced "teeth" wear, which may increase drilling performance and productivity.

During mechanical excavation and removal of rock, significant wear can be seen on excavator teeth and buckets. Excavator teeth and buckets having a wear resistant coating described herein applied thereto may have prolonged life and consequently replacement costs may be reduced.

The outside diameter of a polycrystalline diamond drill bit is subject to sliding wear. A polycrystalline drill bit having a wear resistant coating described herein applied thereto may have an increased serviceable life.

During the life of a polycrystalline diamond drill bit the body and blades of the bit that support the cutting structure may be subject to life-limiting wear. Bodies and blades having a wear resistant coating described herein applied thereto may reduce erosive wear, which may increasing tool life and reduce costs.

Picks are used during the mechanical excavation of rock and the surface dressing of road surfaces. A pick is manufactured generally in two-pieces; body and insert. The body is conventionally steel and the insert commonly cemented carbide. In some circumstances diamond containing inserts are used. Body life is generally limited by excessive wear or "Wash". A body having a wear resistant coating as described herein and in close proximity to the insert may have prolonged life, and reduce down time required for replacing worn picks.

Crusher teeth may be used in various applications including in the mechanical extraction of oil from oil containing sand. The crusher teeth may be positioned around a rotating drum and mechanically interact with the rock, sand and oil. Wear may be great. Crusher teeth having a wear resistant coating as described herein applied thereto may have prolonged life.

In the context of gas and oil drilling, a mud-powdered motor drives bit rotation and torque. The motor may contain both radial and axial bearings that are in sliding contact with opposing bearings or rolling elements. A bearing having a wear resistant coating as described herein applied thereto may significantly increase bearing life, reduce bearing length and offer the ability for more sets of bearings that promote higher bit-weights and better productivity when drilling for oil and gas.

Fabrication of the Plurality of Round Particles

An example method for the fabrication of examples of the plurality of round particles will now be described. Generally, any suitable method for fabrication of round particles may be used. A mixture of tungsten carbide powder having a Fisher sub sieve size of 1 μm and cobalt powder having a Fisher sub sieve size of 1.2 μm were mixed 50/50 by weight. Alternatively or additionally to cobalt, any suitable metal powder, for example a powder comprising at least one of Nickel, copper, and alloys thereof. MBS955 Si2 40/50 mesh diamonds are tumbled in the mixture of tungsten carbide powder and cobalt powder with a binding agent in the form of methyl cellulose while controlled amounts of water is simultaneously sprayed thereon. Each diamond is coated to form the plurality of round particles in a green state. The plurality of round particles in the green state may then be heated in a Borel furnace under a protective hydrogen atmosphere. The plurality of round particles in the green state may be heated around room temperature to 500° C. over an hour approximately. The plurality of round particles are maintained at 500° C. for around 30 min. The temperature is then elevated to 850° C. over around 180 min. The sintered plurality of round particles are allowed to cool.

Now that embodiments have been described, it will be appreciated that some embodiments may have some of the following advantages:

A brazing rod may be convenient for forming a wear resistant coating on a substrate.

Wear resistant elements may have a relatively low density. Consequently, in the prior art, the wear resistant elements may be poorly distributed in the wear resistant coating and can be in close proximity to one another, or even touching which may weaken the structure because braze infiltration may be reduced. Thin coatings onto a super hard material may not fully overcome these density differences or avoid part-to-part contact. Encapsulation of the super hard phases (and penetration of the round outer layer by the binding material) may ameliorate these problems.

The round nature of the encapsulant and/or with careful selection of sizes and shapes of interstices occupying particles promotes high packing and further optimizes wear resistance.

The structure of the encapsulant may be either an open or closed structure. An open semi-porous topography may provide high surface area and strong capillary forces for reaction and infiltration.

During cooling and solidification of the braze material, the encapsulated wear resistant elements may be placed under compression by the encapsulant, providing improved retention and better wear properties.

The liquid metal infiltration of the encapsulant during the brazing process and subsequent solidification may provide a mechanically improved compressive stress that holds and bonds the super hard elements in. This advantage is not enjoyed by non-encapsulated super hard elements.

The wear resistant elements discussed herein have significantly increased hardness and wear resistance compared to tungsten carbide based metal matrices formed by conventional hardfacing materials.

The wear resistant elements may be metallurgically bonded to the wear resistant binder by way of the intermediate coating 30. This may improve the attachment of the wear resistant elements and the wear resistant coating's performance and life.

Variations and/or modifications may be made to the embodiments described without departing from the spirit or ambit of the invention. For example, while the substrate disclosed above is steel, it will be appreciated that embodiments may be used on other substrate materials, for example another metal such as aluminum, a cemented carbide, or generally any suitable substrate material. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

What is claimed is:

1. A composite material, comprising:
    a plurality of round particles bound together by a binding material, each of the plurality of round particles comprising:
        a wear resistant element;
        an intermediate coating on the wear resistant element, the intermediate coating comprising titanium; and
        a porous round outer layer encapsulating the intermediate coating and the wear resistant element, the porous round outer layer comprising a composite material that includes tungsten carbide and a sintering aid;
    wherein the intermediate coating is metallurgically bonded to the wear resistant element, and is metallurgically bondable to the binding material.

2. The composite material of claim 1, wherein the composite material is configured to form a brazing rod.

3. The composite material of claim 2, wherein the composite material is heated to form the brazing rod.

4. The composite material of claim 3, wherein the binding material is melted to form a monolithic matrix of metallic binding material.

5. A coating on a substrate, wherein the coating comprises the composite material of claim 1.

6. The composite material of claim 1, wherein the porous round outer layer is metallurgically bonded to the intermediate coating.

7. The composite material of claim 1, wherein the porous round outer layer is penetrated by the binding material.

8. The composite material of claim 7, wherein the binding material is metallurgically bonded to at least one of an inner surface and an outer surface of the porous round outer layer.

9. The composite material of claim 7, wherein the binding material is metallurgically bonded to the intermediate coating.

10. The composite material of claim 1, wherein the porous round outer layer comprises a cermet and the intermediate coating comprises a metallic coating that includes titanium.

11. A method of using the composite material of claim 1 to form a wear resistant coating on a substrate, the method comprising the steps of:
    forming a brazing rod from the composite material;
    heating the brazing rod to form a brazing rod melt;
    flowing the brazing rod melt over a surface of the substrate; and
    solidifying the brazing rod melt on the surface of the substrate, thereby forming the wear resistant coating on the substrate.

12. The method of using the composite material of claim 11, further comprising causing the binding material to penetrate the porous round outer layer and to metallurgically bond to the intermediate coating.

13. A brazing rod for forming a wear resistant coating on a substrate by a brazing process, the brazing rod comprising the composite material of claim 1.

14. The brazing rod of claim 13, wherein the porous round outer layer is metallurgically bonded to the intermediate coating.

15. The brazing rod of claim 13, wherein the porous round outer layer is penetrated by the binding material.

16. The brazing rod of claim 15, wherein the binding material is metallurgically bonded to at least one of an inner surface and an outer surface of the porous round outer layer.

17. The brazing rod of claim 15, wherein the binding material is metallurgically bonded to the intermediate coating.

18. The brazing of claim 13, wherein the porous round outer layer comprises a cermet and the intermediate coating comprises a metallic coating that includes titanium.

19. The brazing rod of claim 13, wherein the plurality of round particles are arranged in a close-packed arrangement.

20. The brazing rod of claim 19, wherein a majority of the plurality of round particles each have a diameter of between 70% and 130% of a mean diameter of the plurality of round particles.

\* \* \* \* \*